United States Patent [19]

Kolodzey et al.

[11] 4,288,869

[45] Sep. 8, 1981

[54] HALF-DUPLEX/SIMPLEX DIGITAL SIGNAL CONVERTER

[75] Inventors: James S. Kolodzey, Chippewa Falls, Wis.; Francis E. Noel, Jr., Knightdale; George R. Stilwell, Jr., Raleigh, both of N.C.

[73] Assignee: International Business Machines Corp., Armonk, N.Y.

[21] Appl. No.: 114,525

[22] Filed: Jan. 23, 1980

[51] Int. Cl.³ .............................................. H04L 5/16
[52] U.S. Cl. .......................................... 370/31; 370/4; 179/170 NC
[58] Field of Search ..................... 370/31, 32, 1, 4, 29; 455/606; 375/7; 179/170 NC

[56] References Cited

U.S. PATENT DOCUMENTS 3,967,059  6/1976  Moore et al. .......................... 370/31
3,999,013  12/1976  Reed et al. ............................. 370/31

*Primary Examiner*—Douglas W. Olms
*Attorney, Agent, or Firm*—Gerald R. Woods

[57] ABSTRACT

A solid state circuit, which serves as a twin simplex/half-duplex converter, includes a triple input NAND gate. The output of the NAND gate is connected directly to the outgoing simplex conductor. Signals on the incoming simplex conductor are applied to the three inputs of the NAND gate through separate signal paths which introduce different delays. One signal path introduces an intermediate delay before applying the incoming signal to the NAND gate in an inverted form. The half-duplex line is connected to this signal path. While incoming signals are applied to all three inputs to the NAND gate as well as to the half-duplex line, a lack of coincidence at the inputs prevents any incoming signal from passing through the converter to the outgoing simplex line.

4 Claims, 3 Drawing Figures

HALF-DUPLEX/SIMPLEX DIGITAL SIGNAL CONVERTER

TECHNICAL FIELD

The present invention relates to signal converters and more particularly to a circuit which provides an interface between a half-duplex data path and a simplex data path.

PRIOR ART

Digital data is commonly transmitted within data communication systems or data processing systems over cables or conductor pairs in a half-duplex mode of operation. In a half-duplex mode, data can be transmitted in either direction over a cable but only at different times. Where the data is to be transmitted via optical fibers or where repeater amplifiers are required, the digital signals are normally converted to simplex signals. In a simplex mode of operation, the data is transmitted over one conductor and is received over another independent conductor.

Where the signals are being transmitted in electrical form, the conversion between half-duplex and simplex modes of operation is conventionally carried out with special transformers known as hybrid transformers. There are a number of drawbacks to hybrid transformers. They are relatively expensive and require special mounting and circuit connections. Moreover, they have a limited bandwidth which causes any signal transmitted through them to be degraded or distorted. Finally, they basically perform a signal-splitting function in which 50% of the power of an incoming signal is lost.

Where data is being transmitted in optical form, a beam splitter is normally used to convert the signals between half-duplex and simplex modes. Beam splitters are open to the same types of objections as hybrid transformers. Beam splitters are expensive, must be specially mounted and aligned and cause a 50% loss in signal strength.

SUMMARY OF THE INVENTION

The present invention is a simple, inexpensive circuit which serves as an interface between a pair of conductors over which data is transmitted and received in a simplex mode and a single conductor over which data is transmitted and received in a half-duplex mode.

The circuit includes a multiple input coincidence gate which has a first input connected directly to a receiving simplex line and its output connected to a transmitting simplex line. The receiving simplex line is also connected to the coincidence gate through parallel first and second time delay circuits. The first time delay circuit causes a received simplex signal to be applied to the gate after a first delay period. The second time delay causes a received simplex signal to be applied to the gate in an inverted form after a second, shorter delay. The half-duplex line is connected to the second time delay circuit at a point at which any received simplex signal appears in its normal form.

BRIEF DESCRIPTION OF THE DRAWINGS

While the Specification concludes with Claims particularly pointing out and distinctly claiming that which is regarded as the present invention, details of a preferred embodiment of the invention may be more readily ascertained from the following detailed description when read in conjunction with the accompanying drawings, wherein:

DETAILED DESCRIPTION

Figure 1:
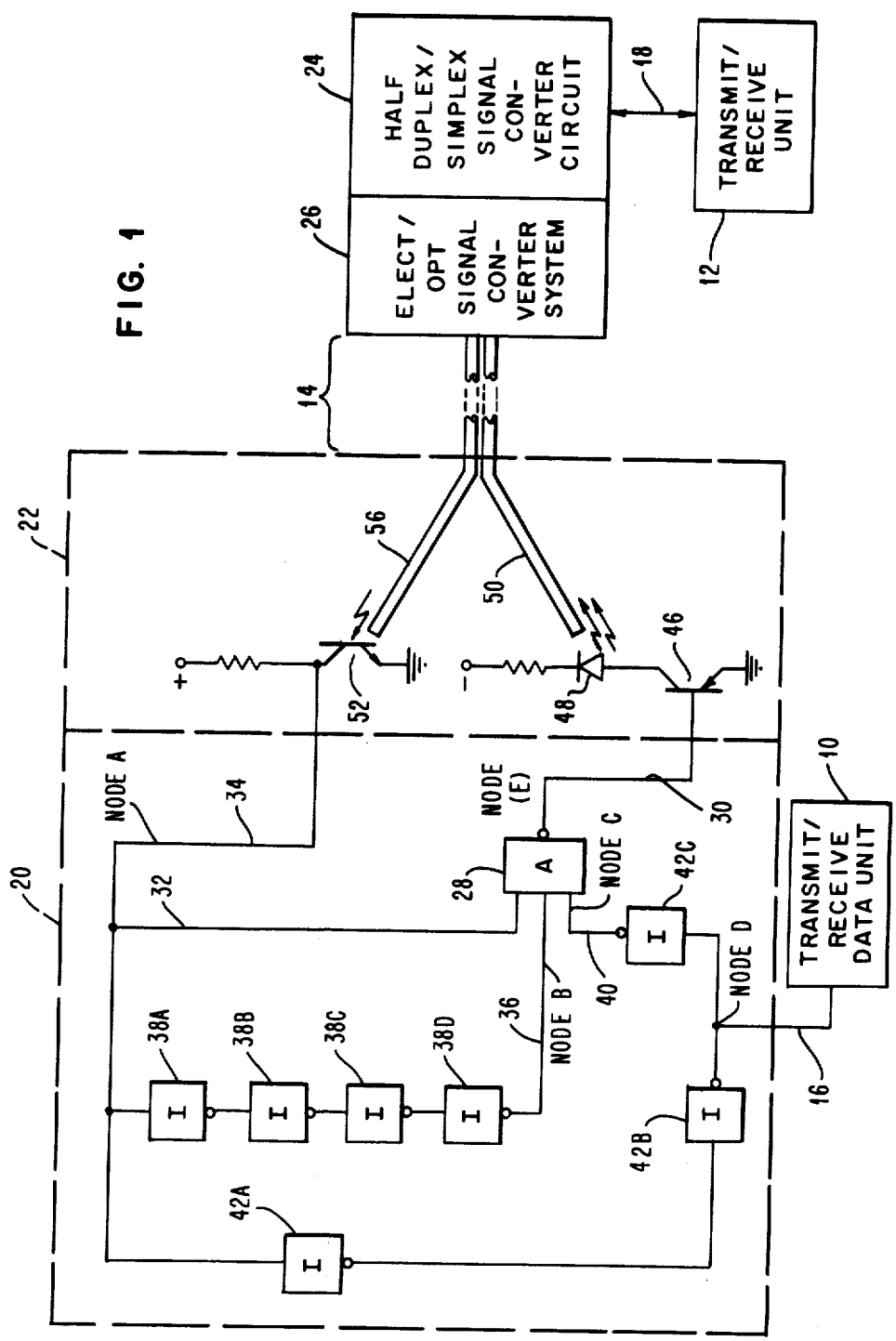
FIG. 1 is a schematic diagram of a data communications system including a half-duplex/simplex digital signal converter circuit constructed in accordance with the present invention.

FIG. 1 represents a generalized data communication system including first and second data transmitting and receiving units 10 and 12 at opposite ends of a data channel 14 including a pair of conventional optical fibers 50 and 56. No particular type of device is intended to be represented by units 10 and 12. Each unit may be any electronic device capable of transmitting and receiving digital data in a half-duplex mode over one or more input/output conductors. At unit 10, data is transmitted and received in a half-duplex mode over a conductor 16. At unit 12, conductor 18 carries digital data in a half-duplex mode.

Data unit 10 is connected to the channel 14 through a half-duplex/simplex digital signal converter circuit 20 and an electrical/optical signal converter circuit 22. Data unit 12 is similarly connected to the channel 14 through a half-duplex/simplex signal converter circuit 24 and an electrical/optical signal converter system 26, each of which is identical to its counterpart circuit 20 or 22.

The signal converter circuit 20 includes a triple input NAND gate 28 having an output simplex line 30 which carries outgoing signals originating within data unit 10. A first input 32 to the NAND gate 28 is connected directly to an input or receiving simplex line 34. A second input 36 is connected to the input line 34 through a first time delay circuit consisting of four serially-connected inverters 38A, 38B, 38C and 38D. The third input 40 to NAND gate 28 is connected to the input line 34 through a second time delay circuit which includes inverters 42A, 42B and 42C. The half-duplex line 16 is connected to the second time delay circuit at a point between the output of inverter 42B and the input of inverter 42C.

Where the channel 14 consists of optical fibers, the simplex lines 30 and 34 must be connected to electro optical transducers. Suitable transducer circuits are shown within the dotted outline 22. For purposes of illustration, it is arbitrarily assumed that an incoming light pulse produces a negative-going electrical signal on line 34 while an outgoing negative signal on line 30 produces a light pulse on optical fiber 50.

The output line 30 may be connected directly to the base terminal of a transistor 46 which serves as a switch for a light emitting diode or LED 48. If line 30 carries a low level signal, transistor 46 conducts, causing the energized LED 48 to emit light which is directed to the optical fiber 50 in the channel 14. Correspondingly, when line 30 carries a high logic level signal, transistor 46 is switched off to de-energize the LED 48.

The incoming simplex line 34 is connected at the collector junction of a phototransistor 52. When the incoming optical signal is high (i.e., light is being transmitted, phototransistor 52 conducts to pull the line 34 toward ground. When no optical signal is presented over the incoming optical fiber 56, phototransistor 52 is non-conductive, allowing line 34 to rise toward the voltage provided by a positive voltage source.

Generally speaking, the circuit described above operates in the following manner to provide half-duplex/simplex digital signal conversion. While incoming digital signals received on line 34 are applied to all three inputs of the NAND gate 28, different delays are introduced at the three inputs. Also, an inverted form of the signal is applied at one of the inputs. As a result, there is a lack of coincidence which prevents any incoming signal from being transferred through the gate 28 to the output line 30. On the other hand, when data unit 10 is transmitting, any signal provided over half-duplex line 16 is isolated from the incoming simplex line 34 by the high reverse impedance of the inverter 42B. Any signal appearing on half-duplex line 16 is transmitted through the inverter 42C and the NAND gate 28 so as to appear in its normal, but delayed, form at line 30. While data unit 10 is transmitting, the other two inputs to NAND gate 28 will be at high logic levels, causing the NAND gate output to follow the signals appearing on line 16.

Figure 2:
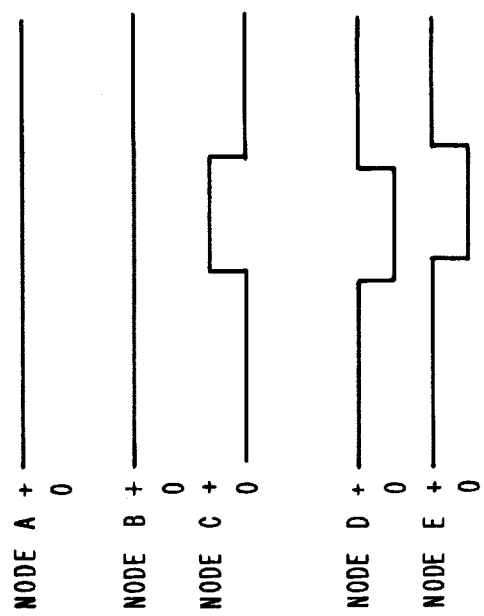
FIG. 2 illustrates the waveforms which are generated at various points or nodes when a single data pulse is received at the converter circuit from an incoming simplex line.

FIG. 2 shows the voltages which exist at various points or nodes in the circuit 20. Each of the nodes is identified by an upper case alphabetic character in FIG. 1. More specifically, node A is the incoming simplex line 34, node B is input 36 to NAND gate 28, node C is input line 40, node D is half-duplex line 16 and node E is the output line 30 from NAND gate 28. Prior to an arbitrarily selected time $T_0$, it is assumed that the receiving optical fiber 56 is transmitting no light; that is, no optical signal. If a light pulse arrives at time $T_0$, phototransistor 52 is driven into its conductive state causing the voltage at node A to drop from a positive potential to or near ground level. The negative going pulse is applied directly to NAND gate 28 over line 32.

The inverter 42A delays and inverts the negative going signal on node A. The inverter 42B further delays and re-inverts the incoming signal so that it appears at node D in its normal form at a time $T_1$. The same signal is also propagated through inverter 42C where it is further delayed and again inverted. Because an odd number of inversion operations are performed, the signal which appears on node C at a time $T_2$ is high or inverted relative to the signal appearing on node A. The low-level signal on node A prevents any switch in NAND gate output when node C goes high.

The incoming negative-going signal which is propagated through the time delay circuit including inverters 38A, 38B, 38C and 38D finally reaches node B at a time $T_3$. The output of the NAND gate 28 remains high since both nodes A and B are then low.

When the incoming negative going pulse ends at a time $T_4$, the signals on nodes A, B and C switch in the same time sequence but in opposite directions. That is, the signal at node A immediately goes high, the signal at node C goes low at a time $T_6$ after being delayed by each of the three inverters 42A, 42B, 42C in the signal chain, and the signal at node B finally goes high at time $T_7$ after being inverted by each of the four serially-connected inverters 38A–38D.

The output of NAND gate is held at its high level between times $T_4$ and $T_6$ by the low level signal at node B. The signal on node C returns to its normal low level at time $T_6$ to hold the NAND gate output at the high level even when nodes A and B are both high after time $T_7$.

Figure 3:
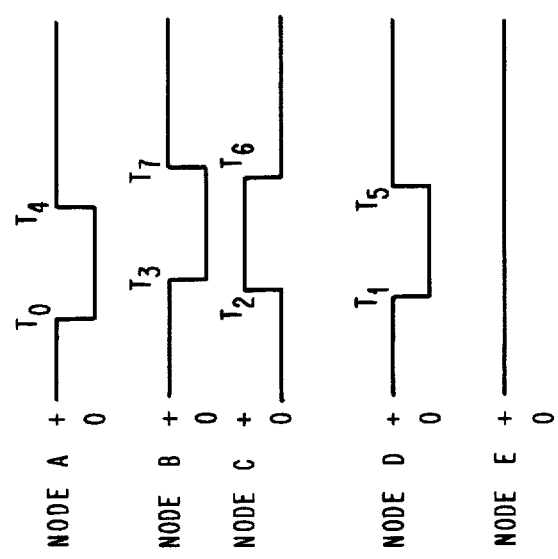
FIG. 3 illustrates waveforms which are generated at the same nodes when a single data pulse is applied to the converter circuit over the half-duplex line from an associated unit.

Referring to FIG. 3, when data unit 10 is transmitting, a negative going pulse is applied to the circuit 20 over the half-duplex line 16. This pulse is inverted by inverter 42B before being applied to the NAND gate 28. The high reverse impedances of NAND gate 44 and 42A isolates the incoming line 34 during transmission. Since the signals at nodes A and B remain at their normal high levels, the output of the NAND gate 28 is switched as a function of the signals appearing at the output of inverter 42B. NAND gate 28 also acts as an inverter causing a delayed negative-going pulse to be applied to the base of transistor 46. Thus, the only difference between signals appearing at nodes D and E is that the latter signals are delayed relative to the former.

It should be apparent that the electro optical converter circuit 22 is required only because communications link 14 utilizes optical fibers. If the communications link were an electrical one, the incoming and outgoing simplex lines 34 and 30, respectively, would be tied directly or through repeater amplifiers to the half-duplex/simplex signal converter circuit.

While there has been described what is considered to be a preferred embodiment of the invention, variations and modifications therein will occur to those skilled in the art once they become acquainted with the basic concepts of the invention. Therefore, it is intended that the appended claims shall be construed to include both the preferred embodiment and all such variations and modifications as fall within the true spirit and scope of the invention.

Having thus described my invention, what I claim as new, and desire to secure by Letters Patent is:

1. A half-duplex/simplex digital signal converter circuit comprising:
   a multiple input coincidence gate having a first input connected directly to a receiving simplex line and its output connected to a transmitting simplex line;
   a first time delay circuit connecting a second input of said gate to said receiving simplex line for causing a received simplex signal to be applied to said gate after a first delay period;
   a second time delay circuit connecting a third input of said gate to said receiving simplex line for causing an inverted form of a received simplex signal to be applied to said gate after a second delay period shorter than said first delay period, said second time delay circuit being connected to the half-duplex line.

2. A circuit as defined in claim 1 wherein said second time delay circuit includes at least two time delay elements connected in series and wherein the half-duplex line is connected at a point intermediate two of said elements.

3. A circuit as defined in claim 2 wherein said first time delay circuit includes a plurality of time delay elements for establishing a delay period of 4T where T is a base delay time while said second time delay circuit includes elements for establishing a delay period of 3T.

4. A circuit as defined in claim 2 wherein the time delay elements connecting the receiving simplex line to the half-duplex line provide a 2T delay period.

* * * * *